US005446355A

United States Patent [19]

Janosky et al.

[11] Patent Number: 5,446,355

[45] Date of Patent: Aug. 29, 1995

[54] MEDIA TRANSPORT SYSTEM WITH HIGH PRECISION POSITION AND SPEED CONTROL

[75] Inventors: Mark S. Janosky; David A. Johnson, both of Rochester; Kenneth A. Lindsay, Brockport; James T. Stoops, Walworth, all of N.Y.

[73] Assignee: Eastman Kodak Company, Rochester, N.Y.

[21] Appl. No.: 127,844

[22] Filed: Sep. 28, 1993

[51] Int. Cl.[6] .................................... G05B 1/06

[52] U.S. Cl. .................................... 318/661; 318/608; 318/606; 318/605

[58] Field of Search .................................... 355/203–205, 355/207–208, 316, 317, 326 R, 327; 318/560, 661, 608, 439, 606, 605; 434/211; 395/105

[56] References Cited

U.S. PATENT DOCUMENTS

| | | | |
|---|---|---|---|
| 4,072,884 | 2/1978 | Treadwell | 318/608 |
| 4,701,839 | 10/1987 | McNally et al. | 318/661 |
| 4,906,909 | 3/1990 | Gremillion et al. | 318/605 |
| 4,962,331 | 10/1990 | Smith | 318/661 |
| 5,007,628 | 4/1991 | Skinner | 271/263 |
| 5,072,179 | 12/1991 | Miller et al. | 318/661 |

FOREIGN PATENT DOCUMENTS

| | | | |
|---|---|---|---|
| 0451321 | 10/1991 | European Pat. Off. | B41J 11/42 |
| 2137966 | 10/1984 | United Kingdom | B65H 7/00 |

*Primary Examiner*—William M. Shoop, Jr.
*Assistant Examiner*—Karen Masih
*Attorney, Agent, or Firm*—Milton S. Sales

[57] ABSTRACT

A media transport system for controlling the position and velocity of media in a document production apparatus marking engine having a media positioning system driven by a motor, includes a motion control loop to control the motor; a sensor adapted to detect the position of the media and to create a trigonometric signal characteristic of the position of the media, the trigonometric signal comprising frequency and phase components; a resolver electronics subsystem adapted to trigonometrically process the trigonometric signal to create a resolved signal; and means for comparing the resolved signal to a reference clock signal of predetermined frequency and phase to provide an error signal used to control the motor that drives the media positioning system. The trigonometric signal may include a sine portion and a cosine portion. The sine portion of the trigonometric signal is $\sin(\omega_e{*}t+\phi_e)$ and the cosine portion of the trigonometric signal is $\cos(\omega_e{*}t+\phi_e)$; where $\omega_e$ is the trigonometric signal frequency component, $\phi_e$ is the trigonometric signal phase component, and t is the time. The resolver electronics subsystem may include a first multiplier adapted to output the product of the sine portion of the trigonometric signal and a reference cosine command $\cos(\omega_r{*}t+\phi_r)$; a second multiplier adapted to output the product of cosine portion of the trigonometric signal and a reference sine command $\sin(\omega_r{*}t+\phi_r)$, where $\omega_r$ is the frequency of the reference command and $\phi_r$ is the phase of the reference command; and means to add the outputs of the first and second multipliers.

16 Claims, 5 Drawing Sheets

MEDIA TRANSPORT SYSTEM WITH HIGH PRECISION POSITION AND SPEED CONTROL

BACKGROUND OF THE INVENTION

1. Technical Field

This invention relates generally to document production apparatus such as copiers, printers, and other marking engines having the need to transport media with high position and velocity control to maximize the registration accuracy of the media, thereby insuring the quality of the document.

2. Background Art

Document production apparatus such as copiers, printers, and other marking engines use a variety of methods for moving media so that images can be transferred onto hard copy output paper or transparency media. For example, color thermal printers use a media transport control system to move media (receiver webs and sheets) beneath a thermal print head.

In color printers, the quality of the final print image is directly related to the registration accuracy of the successive color planes on the final print. Therefore, media transport systems for color printers are designed to very accurately control the position and velocity of the media so as to maximize the ability to print two or more successive color planes in a highly registered fashion.

Accurate position and velocity control is especially difficult in thermal printers because the required media velocities are generally very low relative to other types of document production apparatus. Therefore, designers have long attempted to employ methods for enhancing the position and velocity control of the media. Such methods have ranged from simple to exotic. For example, a simple method might include the use of a stepper motor with a speed reduction transmission system to drive a rotating drum or roller; while an exotic method might include a closed loop feedback system to control a DC motor that powers a drum or roller.

One such closed loop feedback system is shown in FIG. 1, wherein a computer-generated desired-position command is compared with a trigonometric signal (explained below) by a digital comparator 10. The difference signal is converted to analog form at 12 and input to a compensation network 14 for filtering. The filtered signal is amplified at 16 and used to drive a DC motor 18 for positioning the media via, say, a rotating drum or roller. The media position is detected by a digital position sensor 20, which creates the trigonometric signal which was referred to above as one of the inputs to comparator 10.

While motion control loops such as shown in FIG. 1 are widely used, they have the disadvantage of requiring many performance tradeoffs, depending on the designer's choice of subsystems. For example, amplifier 16 may be a voltage drive or a current drive. If a voltage drive amplifier is chosen, inherent speed control is provided by the back electro-motive force of DC motor 18. The system lacks bandwidth due to mechanical and electrical parameters of voltage drive amplifier 16 and DC motor 18. That is, the system has limited positional resolution control related to the number of bits either at digital-to-analog converter 12 or at digital position sensor 20, whichever is lowest. Also, the quantization at digital-to-analog converter 12 creates compensation problems for compensation network 14 of the "feed forward" type.

If, on the other hand, a current drive amplifier is chosen for amplifier 16, the bandwidth for the feedback system can be increased. However, a velocity control feedback sensor or state space estimation should be used to stabilize the loop and provide velocity control. Even with this velocity control, performance will be marginal for high performance image printing. One solution to this poor velocity control is to make sure that compensation network 14 has at least two integrators so as to drive velocity errors to zero for a constant velocity input (position ramp input). However, the ability to stabilize these loops usually becomes extremely difficult and costly. In addition, the resolution and quantization problems mentioned above will still exist.

It has also been suggested to at provide precision velocity control by utilizing a motion control loop such as illustrated in FIG. 2. This particular motion control loop utilizes a phase lock loop for the velocity control portion of the motion control loop. It has many of the same subsystems as the motion control loop of FIG. 1, identified by primed reference numerals, but utilizes a phase detector 24, a switch 26, and a magnitude comparator 28 in place of the digital comparator 10 of FIG. 1.

Basically, this motion control loop of FIG. 2 separates the position and velocity controls. Switch 26 will start in the position mode as illustrated while a desired position profile and feedback from digital position sensor 20' are compared at magnitude comparator 28. When the loop approaches a speed equivalent to a desired constant speed (such as in the printing mode of a printer), the state of switch 26 is changed to allow the velocity mode to take over, whereupon the phase detector 24 is used to provide an error signal for the motion control loop. When in the velocity mode, the motion control loop provides ultra precision velocity control, but does not know where it is in absolute position space (an external counter could keep track of the digital position sensor 20' divisions but cannot provide control). In addition, the position portion of this motion control loop of FIG. 2 still has the limiting capabilities described for the motion control loop of FIG. 1.

DISCLOSURE OF INVENTION

Accordingly, it is an object of the present invention to achieve high precision position and velocity control of a media transport system so that a very high quality printed image can be produced.

It is another object of the present invention to achieve high precision position and velocity control of a media transport system so that a very high quality color printed image can be produced.

It is still another object of the present invention to achieve high precision position and velocity control of a media transport system by utilizing some of the inherent advantages of closed loop control theory without being subject to many of the design tradeoffs discussed in the Background Art section of this specification.

In accordance with one feature of the present invention, a media transport system for controlling the position and velocity of media in a document production apparatus marking engine having a media positioning system driven by a motor, includes a motion control loop to control the motor; a sensor adapted to detect the position of the media and to create a trigonometric signal characteristic of the position of the media; a resolver electronics subsystem adapted to trigonometrically process the trigonometric signal to create a resolved signal; and means for comparing the resolved signal to a reference clock signal to provide an error signal used to control the motor that drives the media positioning system.

In accordance with another feature of the present invention, a media transport system for controlling the position and velocity of media in a document production apparatus marking engine having a media positioning system driven by a motor, includes a motion control loop to control the motor; a sensor adapted to detect the position of the media and to create a trigonometric signal characteristic of the position of the media, the trigonometric signal comprising frequency and phase components; a resolver electronics subsystem adapted to trigonometrically process the trigonometric signal to create a resolved signal; and means for comparing the resolved signal to a reference clock signal of predetermined frequency and phase to provide an error signal used to control the motor that drives the media positioning system.

In accordance with yet another feature of the present invention, a method for controlling the position and velocity of media in a document production apparatus marking engine having a media positioning system driven by a motor, includes detecting the position of the media; creating a trigonometric signal characteristic of the position of the media; trigonometrically processing the trigonometric signal to create a resolved signal; comparing the resolved signal to a reference clock signal to provide an error signal; and controlling the motor that drives the media positioning system with the error signal.

In accordance with still another feature of the present invention, a method for controlling the position and velocity of media in a document production apparatus marking engine having a media positioning system driven by a motor, includes detecting the position of the media; creating a trigonometric signal characteristic of the position of the media, the trigonometric signal comprising frequency and phase components; trigonometrically processing the trigonometric signal to create a resolved signal; and comparing the resolved signal to a reference clock signal of predetermined frequency and phase to provide an error signal used to control the motor that drives the media positioning system.

According to a preferred embodiment of the present invention, the trigonometric signal includes a sine portion and a cosine portion. The sine portion of the trigonometric signal is $\sin(\omega_e{}^*t+\phi_e)$ and the cosine portion of the trigonometric signal is $\cos(\omega_e{}^*t+\phi_e)$; where $\omega_e$ is the trigonometric signal frequency component, $\phi_e$ is the trigonometric signal phase component, and t is the time. The resolver electronics subsystem includes a first multiplier adapted to output the product of the sine portion of the trigonometric signal and a reference cosine command $\cos(\omega_r{}^*t+\phi_r)$; a second multiplier adapted to output the product of cosine portion of the trigonometric signal and a reference sine command $\sin(\omega_r t+\phi_r)$, where $\omega_r$ is the frequency of the reference command and $\phi_r$ is the phase of the reference command; and means to add the outputs of the first and second multipliers.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

For purposes of illustration, the present invention will be described in an environment of a thermal printer, although one skilled in the art will understand that the invention is useful in other types of document production apparatus. For example, the invention is useful in other types of printers as well as in optical or digital copiers.

Figure 3:
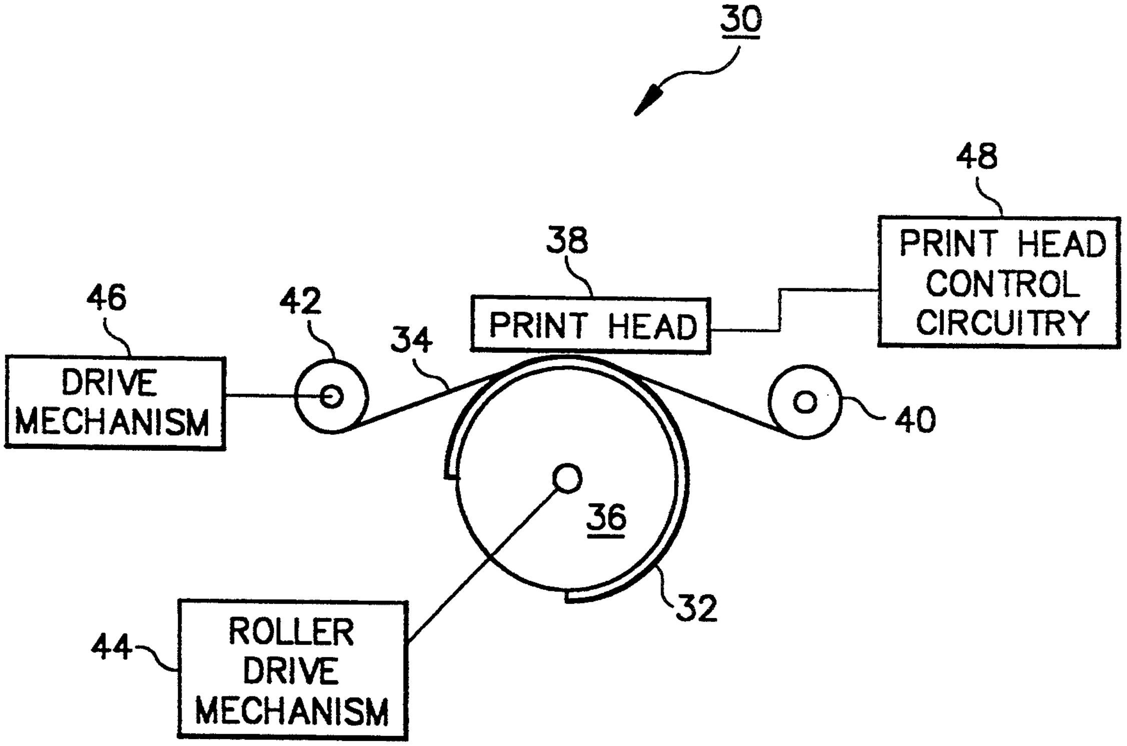
FIG. 3 a schematic side view of a thermal printer apparatus having a media transport system in which the high precision position and speed control of the present invention is useful.

Referring now to FIG. 3, there is shown a thermal print apparatus 30 in which the high precision position and speed control of the present invention is useful. Apparatus 30 comprises a receiver member 32, a dye carrier member 34, a rotatable drum 36, a thermal print head 38, a dye carrier member supply roller 40, a dye carrier member take-up roller 42, a drum drive mechanism 44, a roller drive mechanism 46, and print head control circuitry 48.

Thermal print apparatus 30 is arranged to print color images on receiver member 32 from dyes transferred from the dye carrier member 34. Receiver member 32, in the form of a sheet of material such as paper, is secured to and positioned around a portion of rotatable drum 36 which is coupled to drum drive mechanism 44. It is to be understood that drum drive mechanism 44 includes a motor (not shown) adapted to advance drum 36 and receiver member 32 under thermal print head 38.

Thermal print head 38 has a plurality of thermal heating elements which press dye carrier member 34 against receiver member 32. Dye carrier member 34 is in the form of a web which is driven from supply roller 40 onto take-up roller 42 by roller drive mechanism 46 coupled to take-up roller 42. Drive mechanisms 44 and 46 each include a motor (not shown) which advance dye carrier member 34 and receiver member 32 relative to thermal print head 38.

In operation, drive signals are continuously provided to drum drive mechanism 44 from, for example, a microcomputer (not shown) to rotate drum 36 and bring successive contiguous areas of receiver member 32 into the print region opposite the thermal heating element in thermal print head 38. A portion of a dye frame (not shown) containing a particular dye color on dye carrier member 34 is disposed between print head 38 and receiver member 32. Receiver member 32 and dye carrier member 34 are moved relative to the print head 38 during the printing operation. Energizing signals are provided to the thermal heating elements of thermal print head 38 by print head control circuitry 48 to selectively heat the thermal heating elements and cause dye from the particular dye frame to be transferred from dye carrier member 34 to receiver member 32.

As receiver member 32 moves through each print line of the print region opposite thermal print head 38, the selective energization of the thermal pixels results in printing of a color image on receiver member 32. The color of this image is determined by the color of the thermally transferable dye contained in the particular dye frame (not shown here but illustrated in FIG. 3 of U.S. Pat. No. 4,621,271) of dye carrier member 34 that is driven past the print region. After one complete color frame of the image has been printed, receiver member 32 is returned to an initial, or "home" position. Dye carrier member 34 is advanced to move a frame of another dye color into position for printing. The thermal heating elements in print head 38 are selectively energized so as to print the next color frame of the image superimposed on the first printed color frame. This process is repeated until all of the different color frames needed to produce the desired image are superimposed on receiver member 32.

Figure 1:
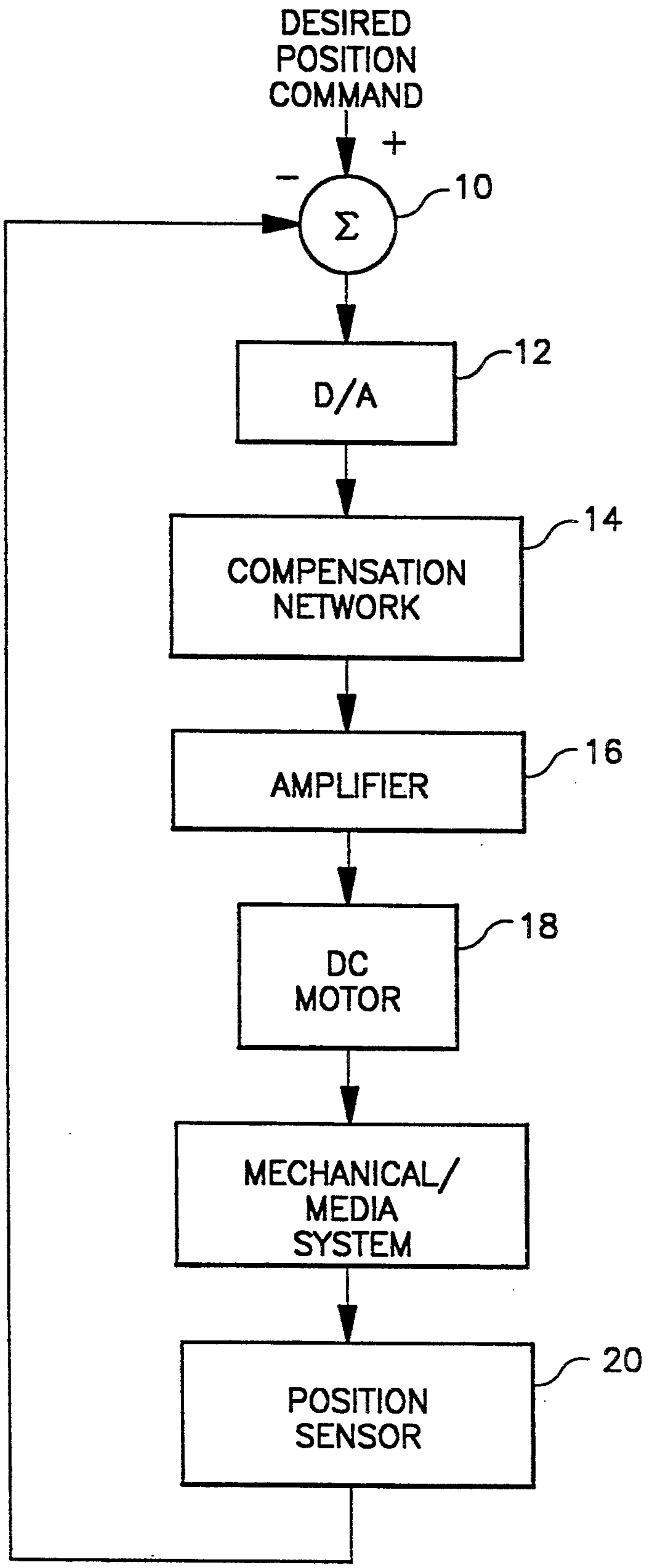
FIG. 1 (PRIOR ART)
FIG. 1 is a functional block diagram of a motion control loop known in the prior art.
Figure 2:
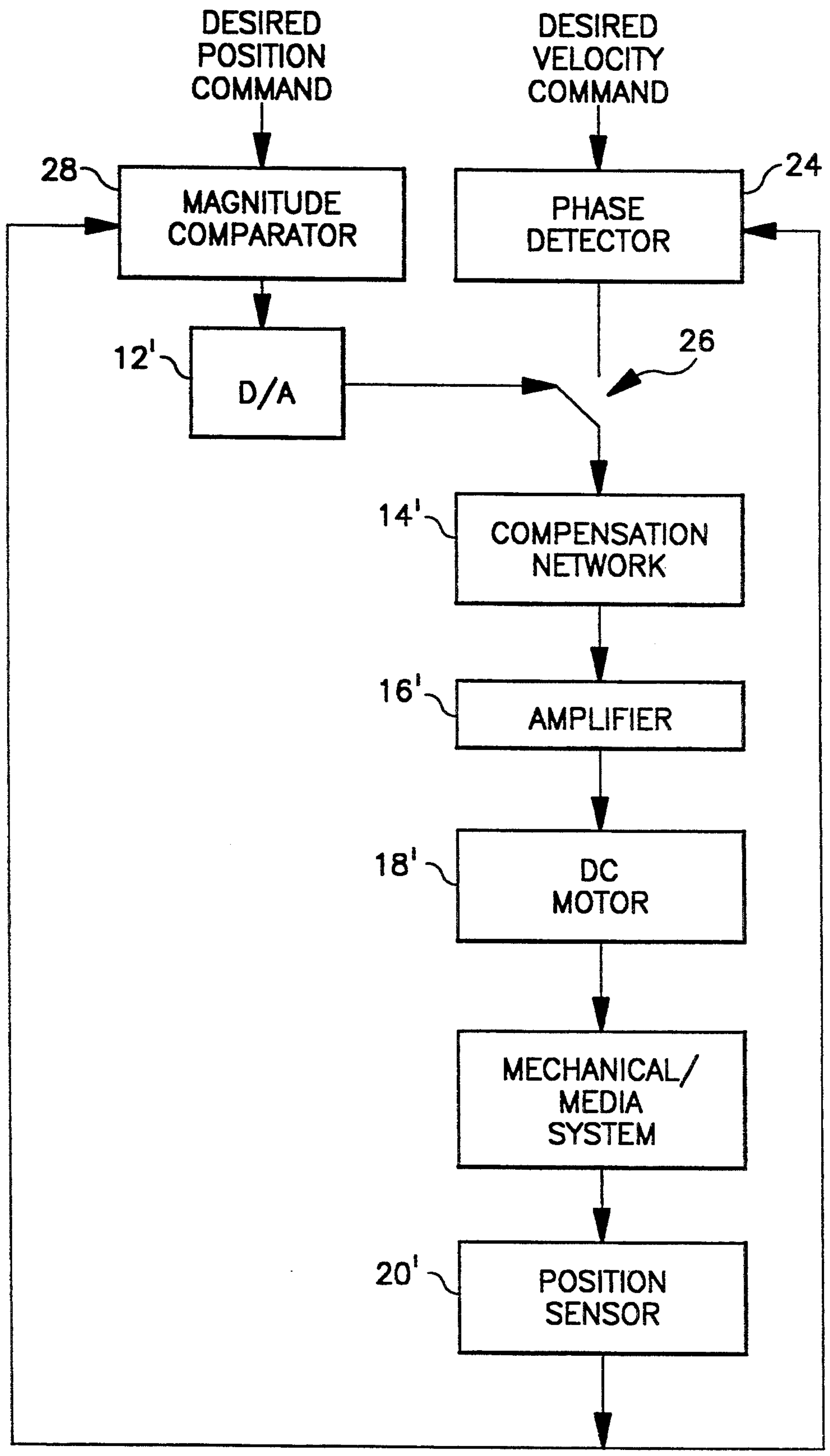
FIG. 2 (PRIOR ART)
FIG. 2 is a functional block diagram of another motion control loop known in the prior art.
Figure 4:
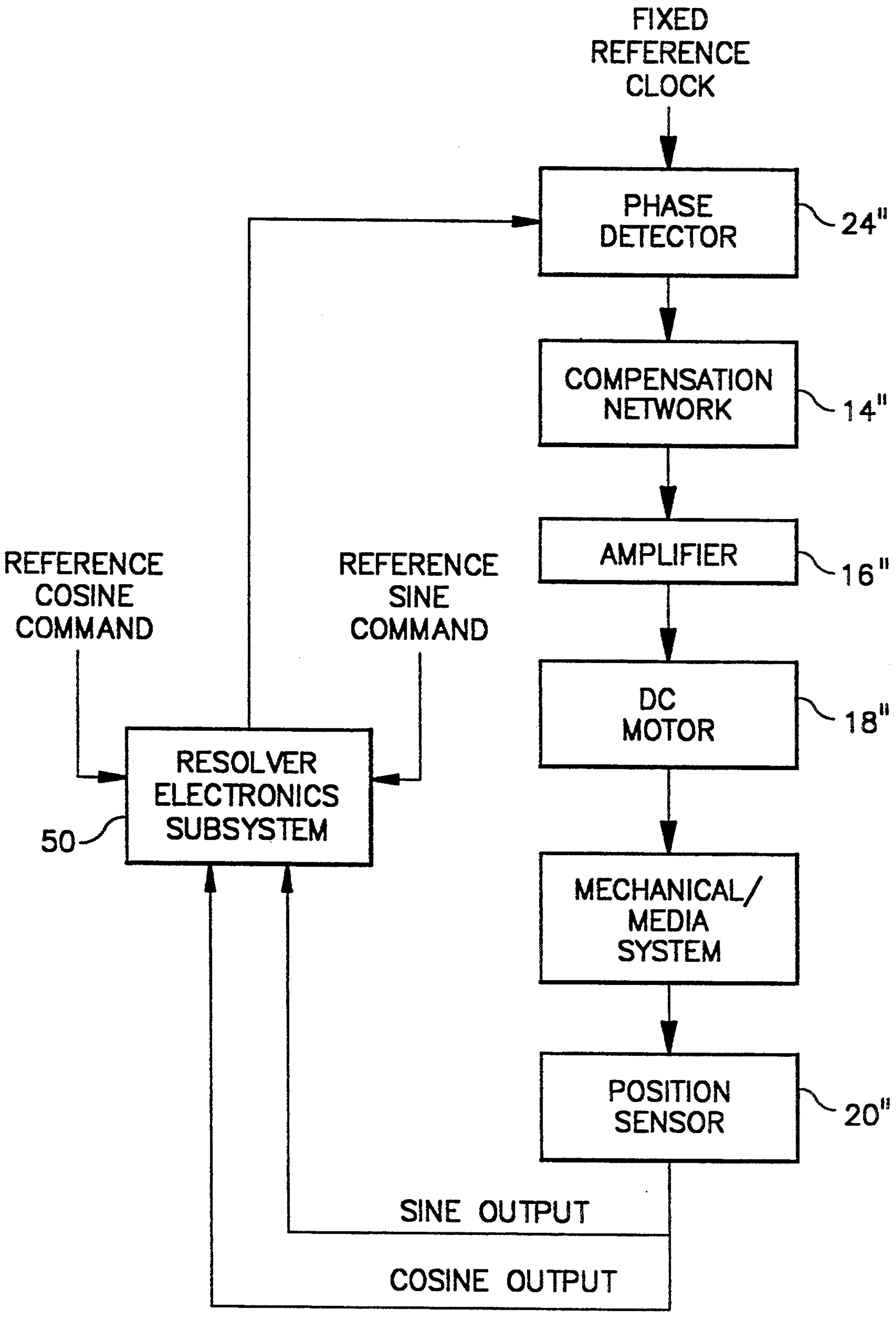
FIG. 4 is a functional block diagram of a motion control loop according to a preferred embodiment of the present invention.

In order to provide high precision position and velocity control, a new motion control loop is proposed. FIG. 4 illustrates this concept. In FIG. 4, subsystems which have similar counterparts in FIGS. 1 and/or 2 are identified by double-primed reference numerals.

Digital position sensor 20" detects the position of the media and creates a trigonometric signal such as a sine signal $\sin(\omega_e{*}t+\phi_e)$ and a cosine signal $\cos(\omega_e{*}t+\phi_e)$, where:

$\omega_e$=encoder signal frequency (rad./sec.), $\phi_e$=encoder signal phase (radians), and t=time (seconds).

Figure 5:
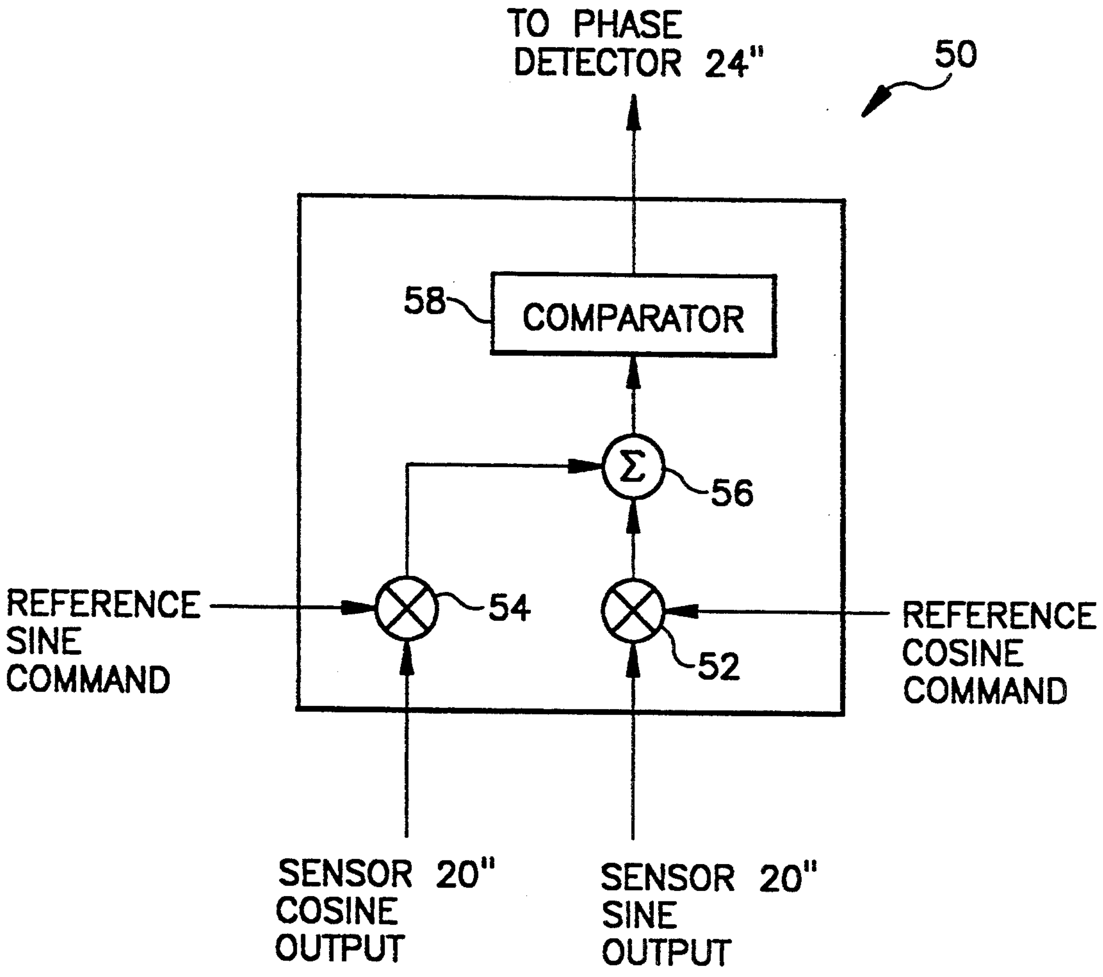
FIG. 5 is a functional block diagram of a detail of the functional block diagram of FIG. 4.

These outputs are trigonometrically processed by a resolver electronics subsystem 50. The preferred embodiment of resolver electronics subsystem 50 is illustrated in FIG. 5. The sine and cosine signals from digital position sensor 20" are input to two multipliers 52, 54. Also input to multiplier 52 is a reference cosine command $\cos(\omega_r{*}t+\phi_r)$ while a reference sine command $\sin(\omega_r{*}t+\phi_r)$ is input to multiplier 54, where:

$\omega_r$=reference signal frequency (rad./sec.), and $\phi_r$=reference signal phase (radians).

The two resulting signals out of multipliers 52, 54 are then input to a summer 56. The output of summer 56 has the trigonometric form:

$$\sin(\omega_e{*}t+\phi_e){*}\cos(\omega_r{*}t+\phi_r)+$$

$$\cos(\omega_e{*}t+\phi_e){*}\sin(\omega_r{*}t+\phi_r)(1)$$

Using the trigonometric function:

$$\sin(x+y)=\sin\times\cos y+\cos\times\sin y,$$

equation (1) can be reduced to:

$$\sin[(\omega_e+\omega_r){*}t+(\phi_e+\phi_r)] \quad (2)$$

The sinusoidal output signal of the summer 56 is a resolved signal then sent to a conventional comparator 58 to drive the remainder of the motion control loop to provide high precision position resolution control and high precision ultra low velocity control.

Comparator 58 transforms the sinusoidal type signal into a digital signal such as by conventional zero-crossover techniques. This digital signals is then input to phase detector 24" (FIG. 4), where it is compared to a fixed reference clock of frequency $\omega_f$ radians/second and phase $\phi_f$ radians to provide an error signal. This error signal is input to compensation network 14" for filtering. The filtered signal is amplified at 16", and used to drive a motor 18", such as a DC stepper motor, for positioning the media. The media position is detected by digital position sensor 20", which creates the sine and cosine outputs referred to above as the input to resolver electronics 50.

If the control process defined by the motion control loop of FIG. 4 is satisfied, the output of phase detector 24" will try to go to zero, whereupon:

$$\omega_e+\omega_r=\omega_f$$

and $$\phi_e+\phi_r=\phi_f.$$

Rearranging the term of these equations, $$\omega_e=\omega_f-\omega_r$$

and $$\phi_e=\phi_f-\phi_r$$

when the motion control loop of FIG. 4 is satisfied.

Accordingly, by controlling the differences $(\omega_f-\omega_r)$ and $(\phi_f-\phi_r)$, $\omega_e$ and $\phi_e$ will be controlled; thereby controlling the speed and position, respectively, of the mechanical/media system. Therefore, $\omega_e$ can be run as slow as the difference between $\omega_f$ and $\omega_r$, and $\phi_e$ can be positioned as small as the difference between $\phi_f$ and $\phi_r$. It also can be seen that bi-directional control is inherent if $\omega_f$ is larger than the range of $\omega_r$. The same is true for $\phi_e$. However, $\phi_e$ can only be controlled within one division of the digital position sensor 20". Therefore, for a motion profile that requires a region of acceleration, followed by a region of constant velocity, and finally followed by a region of deceleration, the acceleration and deceleration regions must be accomplished in one division of the digital position sensor 20".

From the above description, it can be seen that the present invention provides a media transport system having inherent bi-directional velocity control, high precision control at low velocities, and sub digital position sensor resolution position control.

The invention has been described in detail with particular reference to preferred embodiments thereof, but it will be understood that variations and modifications can be effected within the spirit and scope of the invention. For example, it should be noted that phase detector 24" can be removed, but the loop looses bi-directional control, and becomes more difficult to control.

What is claimed is:

1. A media transport system for controlling the position and velocity of media in a document production apparatus marking engine having a media positioning system driven by a motor, said transport system comprising:

a motion control loop to control said motor;

a sensor adapted to detect the position of the media and to create a trigonometric signal characteristic of the position of the media; a resolver electronics, subsystem adapted to trigonometrically process the trigonometric signal to create a resolved signal having a frequency component; and a phase detector for comparing the frequency component of the resolved signal to a reference clock frequency signal to provide an error signal used to control the motor that drives the media positioning system.

2. A media transport system as defined in claim 1 wherein the trigonometric signal includes a sine portion and a cosine portion.

3. A media transport system as defined in claim 2 wherein the resolver electronics subsystem includes:

a first multiplier adapted to output the product of the sine portion of the trigonometric signal and a reference cosine command;

a second multiplier adapted to output the product of cosine portion of the trigonometric signal and a reference sine command; and means to add the outputs of said first and second multipliers.

4. A media transport system for controlling the position and velocity of media in a document production apparatus marking engine having a media positioning system driven by a motor, said transport system comprising:

a motion control loop to control said motor;

a sensor adapted to detect the position of the media and to create a trigonometric signal characteristic of the position of the media;

a resolver electronics subsystem adapted to trigonometrically process the trigonometric signal to create a resolved signal having frequency and phase components; and means for comparing the frequency and phase components of the resolved signal to a reference clock signal of predetermined frequency and phase to provide an error signal used to control the motor that drives the media positioning system.

5. A media transport system as defined in claim 4 wherein the trigonometric signal includes a sine portion and a cosine portion.

6. A media transport system as defined in claim 5 wherein the resolver electronics subsystem includes:

a first multiplier adapted to output the product of the sine portion of the trigonometric signal and a reference cosine command;

a second multiplier adapted to output the product of cosine portion of the trigonometric signal and a reference sine command; and means to add the outputs of said first and second multipliers.

7. A media transport system as defined in claim 4 wherein the sine portion of the trigonometric signal is $\sin(\omega_e{*}t+\phi_e)$ and the cosine portion of the trigonometric signal is $\cos(\omega_e{*}t+\phi_e)$, where $\omega_e$ is the trigonometric signal frequency component, $\phi_e$ is the trigonometric signal phase component, and t is the time.

8. A media transport system as defined in claim 7 wherein the resolver electronics subsystem comprises multiplier means for multiplying the sine portion of the trigonometric signal by a reference cosine command $\cos(\omega_r{*}t+\phi_r)$ and multiplying the cosine portion of the trigonometric signal by a reference sine command $\sin(\omega_r{*}t+\phi_r)$, where $\omega_r$ is the frequency of the reference command and $\phi_r$ is the phase of the reference command.

9. A media transport system as defined in claim 4 wherein the reference clock signal has a fixed frequency and a fixed phase.

10. A media transport system as defined in claim 4 wherein said document production apparatus is a color printer having means to position and reposition media at a print station to print successive color planes in a highly registered fashion.

11. A media transport system as defined in claim 10 wherein said document production apparatus is a thermal printer.

12. A method for controlling the position and velocity of media in a document production apparatus marking engine having a media positioning system driven by a motor, said method comprising:

detecting the position of the media;

creating a trigonometric signal characteristic of the position of the media;

trigonometrically processing the trigonometric signal to create a resolved signal having a frequency component;

comparing the frequency component of the resolved signal to a reference clock signal of predetermined frequency to provide an error signal; and controlling the motor that drives the media positioning system with the error signal.

13. A method as defined in claim 12 wherein the step of trigonometrically processing the trigonometric signal includes:

multiplying the sine portion of the trigonometric signal by a reference cosine command;

multiplying the cosine portion of the trigonometric signal by a reference sine command; and adding the results of the two multiplying steps.

14. A method for controlling the position and velocity of media in a document production apparatus marking engine having a media positioning system driven by a motor, said transport system comprising:

detecting the position and velocity of the media;

creating a trigonometric signal characteristic of the position of the media;

trigonometrically processing the trigonometric signal to create a resolved signal having frequency and phase components; and comparing the frequency and phase components of the resolved signal to a reference clock signal of predetermined frequency and phase to provide an error signal used to control the motor that drives the media positioning system.

15. A method as defined in claim 14 wherein the step of trigonometrically processing the trigonometric signal includes:

multiplying the sine portion of the trigonometric signal by a reference cosine command;

multiplying the cosine portion of the trigonometric signal by a reference sine command; and adding the results of the two multiplying steps.

16. A method as defined in claim 15 wherein:

the sine portion of the trigonometric signal is $\sin(\omega_e{*}t+\phi_e)$ and the cosine portion of the trigonometric signal is $\cos(\omega_e{*}t+\phi_e)$, where $\omega_e$ is the trigonometric signal frequency component, $\phi_e$ is the trigonometric signal phase component, and t is the time; and the reference cosine command is $\cos(\omega_r{*}t+\phi_r)$ and the reference sine command is $\sin(\omega_r{*}t+\phi_r)$, where $\omega_r$ is the frequency of the reference command and $\phi_r$ is the phase of the reference command.

* * * * *